United States Patent [19]
Kawaguchi et al.

[11] Patent Number: 4,462,448
[45] Date of Patent: Jul. 31, 1984

[54] PNEUMATIC TIRES

[75] Inventors: Yasuyoshi Kawaguchi, Higashiyamato; Hideki Aoyama, Niiza; Eiji Mineki, Higashimurayama, all of Japan

[73] Assignee: Bridgestone Corporation, Tokyo, Japan

[21] Appl. No.: 449,938

[22] Filed: Dec. 15, 1982

[30] Foreign Application Priority Data

Dec. 25, 1981 [JP] Japan .................... 56-215568

[51] Int. Cl.³ .............. B60C 1/00; B60C 15/06
[52] U.S. Cl. .................... 152/354 R; 152/355; 152/357 R; 152/362 R
[58] Field of Search ........... 152/330 R, 353 R, 354 R, 152/354 RB, 355, 356 R, 356 A, 357 R, 358, 359, 360, 362 R, 362 CS

[56] References Cited

U.S. PATENT DOCUMENTS 3,638,705  2/1972  Devienne et al. ............ 152/362 R
3,736,973  6/1973  Mezzanotte et al. .......... 152/362 R

FOREIGN PATENT DOCUMENTS 1369464  7/1964  France ...................... 152/362 R
45-27244  9/1970  Japan .
54-38001  3/1979  Japan .
56-71606  6/1981  Japan .

Primary Examiner—Lois E. Boland
Attorney, Agent, or Firm—Sughrue, Mion, Zinn, Macpeak & Seas

[57] ABSTRACT

A pneumatic tire is disclosed, which comprises a pair of bead portions each containing at least one bead core therein and a carcass of at least one rubberized ply extending between the bead portions and containing organic fiber cords therein and has a load applied to one bead core of not less than 6.0 kg/cm. In this tire, at least one tire-cord layer of organic fibers is further arranged as a flipper between the bead core and the carcass ply so that a distance between a portion of the bead core facing bead base and the carcass ply is within a range of 0.8-3.0 mm and at least ⅓ of the periphery of the bead core is covered with the tire-cord layer.

2 Claims, 4 Drawing Figures

PNEUMATIC TIRES

BACKGROUND OF THE INVENTION

1. Field of the Invention

This invention relates to an improvement in pneumatic tires comprising a pair of bead portions each containing at least one bead core therein and a carcass of at least one rubberized ply extending between the bead portions and containing organic fiber cords therein, and having a load applied to one bead core per unit length of not less than 6.0 kg/cm.

2. Description of the Prior Art

In the conventional pneumatic tire comprising a carcass of at least one organic fiber cord ply between a pair of bead portions each containing a bead core therein and having a load applied to the bead core of more than 6.0 kg/cm, ply separation between the carcass ply and the bead core is produced at the bead portion and finally the cords of the carcass ply are frequently broken about the bead core. Therefore, there have usually been proposed countermeasures for preventing the breaking of the cords of the carcass ply be reducing the load, for example, the enlarging of rim diameter in the tire, the increasing of bead core number and the like. However, these countermeasures are not favorable in view of tire productivity and resource-saving.

Furthermore, tires having a load applied to a pair of bead cores of more than 6.0 kg/cm have been sold in market by some tire manufactures, but they are not yet sufficient in the durability after the retreading.

SUMMARY OF THE INVENTION

It is, therefore, an object of the invention to provide a bead structure in which a force acting between the carcass ply and the bead core is dispersed so as not to produce the ply separation between the bead core and the carcass ply even when the load is not less than 6.0 kg/cm and hence the number of bead cores is reduced and the durability is improved, whereby tire productivity is improved.

According to the invention, there is provided in a pneumatic tire comprising a pair of bead portions each containing at least one bead core therein and a carcass of at least one rubberized ply extending between the bead portions and containing organic fiber cords therein, and having a load applied to one bead core per unit length of not less than 6.0 kg/cm, the improvement comprising at least one tire-cord layer of organic fibers arranged as a flipper between the bead core and the carcass ply so that a distance between a portion of the bead core facing the bead base and the carcass ply is within a range 0.8 to 3.0 mm and at least $\frac{1}{3}$ of the periphery of the bead core is covered with the tire-cord layer.

DETAILED DESCRIPTION OF THE INVENTION

Heretofore, there have been proposed various methods for preventing the cord breaking or ply separation of the carcass ply in the bead portion.

For instance, Japanese Patent Application Publication No. 27,244/70 discloses a tire wherein cushion layers are disposed on both sides of the carcass at the bead portion in order to prevent separation of the carcass from the surrounding rubber. In this case, however, it is difficult to leave a uniform gauge between the bead core and the carcass ply or to arrange the uniform cushion layer therebetween. Furthermore, since the cushion layer is not arranged as a fiber-reinforced layer, the rigidity of the bead portion lowers and as a result it is necessary to use a wire chafer. Therefore, such a tire is not favorable in view of productivity.

In Japanese Patent laid open No. 38,001/79, there is disclosed that the end separation of the carcass ply is reduced by using a flipper and limiting the height of the flipper, but the concrete counting of cords in the flipper is not mentioned at all, so that it is not yet satisfactory against the occurrence of ply breaking failure produced from the ply separation between the carcass ply and the bead core.

Up to now, a tire-cord layer has been usually disposed between the bead core and the carcass ply. In this case, however, the tire-cord layer is not directly related to a load applied to the bead core, but is used as a productivity-improving member for integrally uniting the bead core with an apex rubber or a reinforcing layer for preventing the separation of the carcass ply or a reinforcing layer for reducing rim-chafing of the bead portion as disclosed, for example, in Japanese Patent laid open No. 71,606/81.

According to the invention, at least one tire-cord layer of organic fibers is embedded as a flipper in rubber between the bead portion and the carcass ply so that a distance (l) between a portion of the bead core facing the bead base and the carcass ply is within a range of 0.8 to 3.0 mm, preferably not more than 2.0 mm and at least $\frac{1}{3}$ of the periphery of the bead core is covered with the flipper, whereby a force acting between the carcass ply and the bead core is dispersed to thereby prevent the occurrence of ply separation between the bead core and the carcass ply even when the load is not less than 6.0 kg/cm and to increase the durability of the bead portion. Thus, according to the invention, the number of bead cores can be reduced as compared with the conventional tires.

When the distance l is less than 0.8 mm, the effect of providing the tire-cord layer of organic fibers is not developed. When the distance l exceeds 3.0 mm, cracks occur in the cord end of the carcass ply, which is considered to be due to the fact that the restraint force of the bead core to the carcass ply lowers.

The material of organic fiber to be used in the flipper, can preferably be nylon-6, nylon-6, 6, polyester, rayon and the like.

Figure 1A:
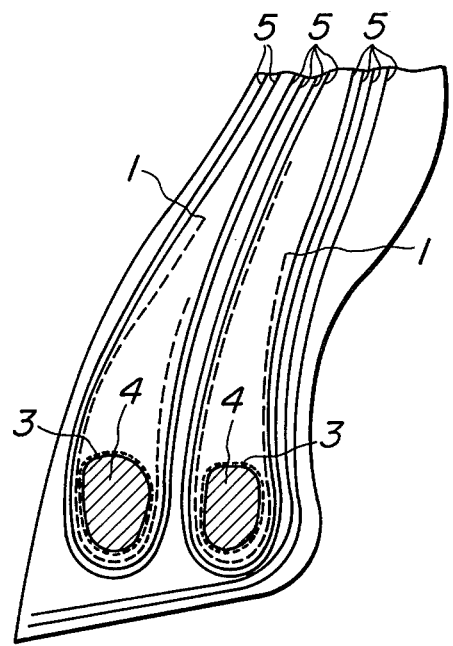
FIGS. 1A and 1B are sectional views of the bead portion in an embodiment of the pneumatic tire according to the invention, respectively.
Figure 1B:
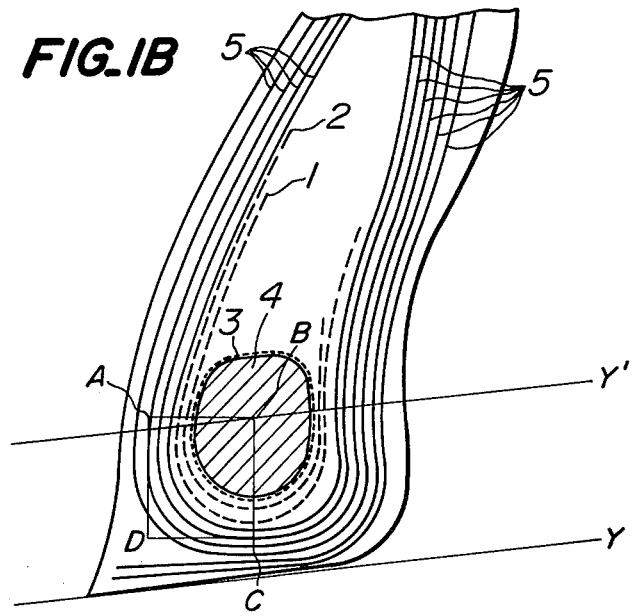

According to the invention, the term "portion of the bead core facing the bead base" means a part facing the tire bead base when the bead core is divided into two equal parts by a straight line Y' parallel to a straight line Y of tire bead base and passing a center of the bead core as shown in FIG. 1B.

The rubber embedding the flipper according to the invention is a vulcanizable rubber consisting of 100 to 40 parts by weight of natural rubber and 0 to 60 parts by weight of at least one synthetic rubber selected from diene polymers such as synthetic isoprene rubber, styrene-butadiene copolymer rubber and polybutadiene-ethylene-propylene terpolymer rubber, and polyisobutylene, which has a hardness after the vulcanization of not less than 65 and contains not more than 8% by weight of a substance to be extracted with a mixed solvent of acetone and chloroform after the vulcanization.

When the hardness of rubber for the flipper is not less than 65, the rigidity of the bead portion increases. When the extractable matter is not more than 8% by weight, the crack propagation resistance of the rubber is considerably improved, by the synergistic action of which is prevented the crack growth between the bead core and the carcass ply.

The invention will be described with respect to the following examples with reference to the drawings.

EXAMPLE 1

A first tire having a size of TBS 1000-20 14PR and a section of bead portion as shown in FIG. 1A was manufactured as a tire A. In this tire, two pairs of bead cores were existent and a load applied to one bead core was 4.3 kg/cm.

A second tire, B was manufactured by using a pair of bead cores instead of two pairs of bead cores in the tire A. In this case, a load applied to one bead core was 8.6 kg/cm. The bead portion of the tire B is shown in FIG. 1B, an area ABCD of which is enlargedly shown in FIG. 2.

Figure 2:
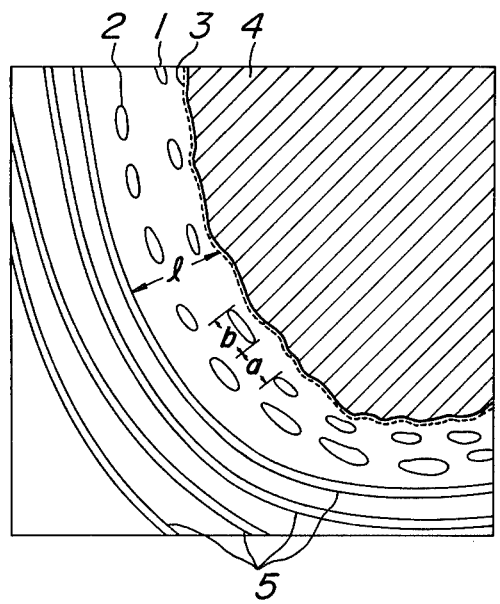
FIG. 2 is an enlarged view of an area ABCD in FIG. 1B.

In FIGS. 1A, 1B, and 2, reference numeral 1 is a flipper adjacent to a bead core, reference numeral 2 a flipper, reference numeral 3 a bead cover tape, reference numeral 4 a bead core, and reference numeral 5 a carcass ply. In FIG. 2, lettering l represents a distance between the bead core and the carcass ply, lettering a a distance between the adjoining fibers of the flipper adjacent to the bead core, lettering b a width of the fiber, and $b/a+b$ is a covering ratio.

In tires A and B, a rubber having a rebound resilience of 80% was used as a tread rubber to restrain a failure of tire crown portion. As regards tire B, twenty tires were manufactured by changing the distance l and the ratio $b/a+b$ within ranges of 0.2–2.0 mm and 20–64%, respectively.

Then, each of the tires A and B inflated to an internal pressure of 6.75 kg/cm$^2$ was run on a drum at a speed of 40 km/hr under a load of 2700 kg for 1250 hours. Thereafter, the tire was cut in the radial direction and observed minutely. As a result, in tire A, cracks of no more than 0.2 mm were only produced between the bead core and the carcass ply, while in the tire B cracks of 0–3 mm were observed in compliance with the values of l and $b/a+b$. In the tires containing cracks of not less than 2 mm, there was observed that a part of fibers in the flipper was broken to form fibrils inside the carcass ply.

As regards tire B, the bead portion was cut out from each of twenty run tires at 20 positions in the radial direction of tire every equal intervals, buffed and photographed at 10 magnifications, from which the length, shape and the like of cracks near the lower portion of the bead core were observed. The maximum crack length was measured from twenty photographs for each tire, while the ratio $(b/a+b)$ of the bead core covered with the fiber in the flipper adjacent to the bead core and distance (l) between the bead core and the carcass ply were determined at the position of maximum crack length, from which was obtained a relationship among $b/a+b$, l and crack as shown in FIG. 3.

Figure 3:
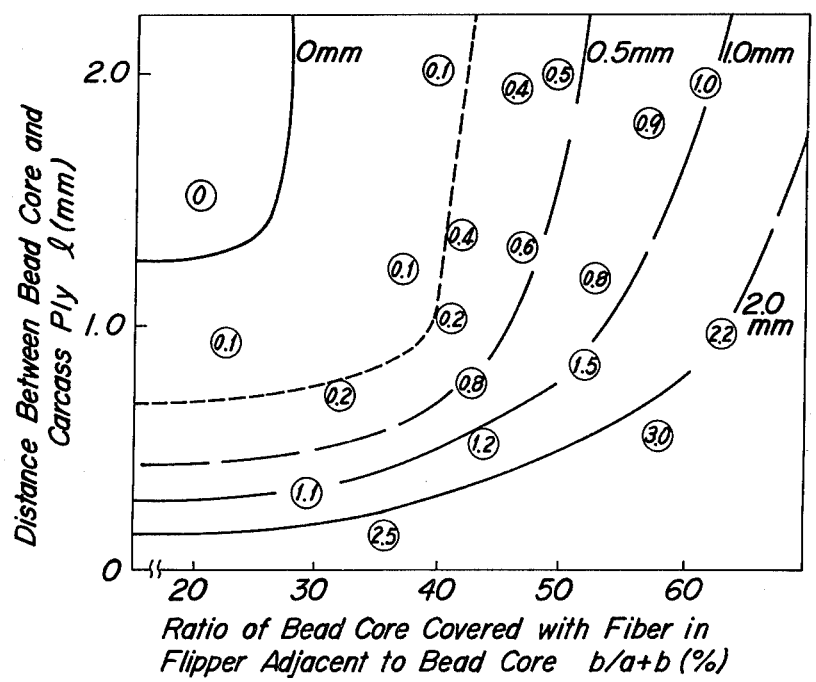
FIG. 3 is a graph showing crack length produced around the bead core at a portion lower than the upper end of the bead core in the test tire of Example 2.

From the results of FIG. 3, it can be seen that stress between the carcass ply and the bead core is mitigated as the distance (l) becomes longer, and that the smaller the ratio $(b/a+b)$, the smaller the occurrence of cracks and hence the crack growth due to the connection of adjoining cracks with each other is prevented.

EXAMPLE 2

In this example, two tires per each of ten kinds of tires A-J having a size of TBS 1000-20 14PR and comprising a carcass of 6 plies each containing nylon cords of 1890 d/2 therein and two pairs of bead cores were manufactured by changing rubber material for flipper, gauge of flipper, cord count in flipper and the like as shown in the following Table 1. As the fiber cord for flipper was used polyester cord of 840 d/2. In the tire J, however, a rubber layer was used instead of the flipper.

The bead portion was cut off from one tire per each kind of tires A-J in the radial direction of tire and subjected at its surface to a buffing. Thereafter, a hardness value at 30 seconds after the application of normal load was measured as a rubber hardness (HD) by means of a microindentation tester (made by Wallace Corp.) to obtain a result as shown in Table 1. Furthermore, the extractable matter was measured as follows: that is, a sample of the flipper inclusive of rubber was carefully cut off from the tire with a knife and its total weight (or initial weight) was weighed. Then, the sample was extracted with a 1:1 mixed solution of acetone and chloroform under reflux for 24 hours, dried under vacuum (at room temperature for 3 hours) and weighed. The value obtained by subtracting the weight after extraction from the initial weight was the extractable matter and was indicated by a ratio to initial weight (%) in Table 1.

The other tire per each kind of tires A-J subjected to an internal pressure of 6.75 kg/cm$^2$ was run on a drum at a speed of 40 km/hr under a load of 2700 kg for 1250 hours like Example 1. Thereafter, the length of crack produced and the presence of crack in cord end of the carcass ply were measured to obtain results as shown in Table 1.

Moreover, the compounding recipe of each of rubber materials (i)–(v) for flipper is shown in the following Table 2.

TABLE 1

| Kind of tire Rubber material for flipper | | A Comparative example (i) | B Example (i) | C Comparative example (i) | D Comparative example (i) | E Comparative example (ii) | F Example (iii) | G Example (iv) | H Comparative example (i) | I Example (v) | J Comparative example (i) |
|---|---|---|---|---|---|---|---|---|---|---|---|
| Surroundings of flipper in new | Rubber hardness | 67 | 67 | 67 | 67 | 67 | 68 | 63 | 67 | 68 | 67 |
| | Extractable | 7.5 | 7.5 | 7.4 | 7.4 | 5.5 | 9.5 | 6.6 | 7.5 | 6.6 | 7.5 |

TABLE 1-continued

| Kind of tire Rubber material for flipper | | A Comparative example (i) | B Example (i) | C Comparative example (i) | D Comparative example (i) | E Comparative example (ii) | F Example (iii) | G Example (iv) | H Comparative example (i) | I Example (v) | J Comparative example (i) |
|---|---|---|---|---|---|---|---|---|---|---|---|
| tire | matter (wt %) | | | | | | | | | | |
| | Minimum distance of l (mm) | 0.6 | 1.7 | 2.9 | 1.1 | 1.8 | 1.4 | 1.5 | 0.7 | 1.5 | 1.5 |
| | Maximum distance of l (mm) | 0.8 | 1.9 | 3.2 | 1.2 | 1.9 | 1.6 | 1.7 | 0.9 | 1.7 | 3.5 |
| | Maximum value of b/a + b (%) | 34 | 31 | 36 | 52 | 43 | 36 | 34 | 29 | 35 | — |
| Results after running test | Maximum crack length (mm) | 1.0 | ≦0.1 | ≦0.1 | 1.6 | 0.8 | 0.3 | 0.3 | 0.6 | ≦0.1 | 2.5 |
| | Presence of crack of more than 5 mm in cord end of carcass ply | absence | absence | presence | absence | absence | absence | absence | absence | absence | presence |

TABLE 2

| Rubber material for flipper | (i) | (ii) | (iii) | (iv) | (v) |
|---|---|---|---|---|---|
| natural rubber RSS #4 | 70 | 70 | 70 | 70 | 70 |
| SBR*1 | 30 | 30 | 30 | 30 | 30 |
| carbon black*2 | 50 | 50 | 50 | 45 | 55 |
| stearic acid | 2 | 2 | 2 | 2 | 2 |
| antioxidant*3 | 1 | 1 | 1 | 1 | 1 |
| aromatic oil*4 | 8 | 5 | 12 | 5 | 5 |
| zinc white | 2 | 2 | 2 | 2 | 2 |
| sulfur | 2.2 | 2.0 | 2.4 | 2.0 | 2.0 |
| vulcanization accelerator*5 | 1.6 | 1.6 | 1.8 | 1.6 | 1.6 |

Note:
*1SBR 1500 (trade name), made by Japan Synthetic Rubber Co, Ltd.
*2HAF Sheet 3 (trade name), made by Tokai Carbon K.K.
*3Nocrac 810 NA (trade name), made by Ouchi Shinko Kagaku K.K.
*4Komolex 700 (trade name), made by Nippon Sekiyu K.K.
*5N—oxydiethylene-2-benzothiazolyl sulfeneamide, Noccelar MSA.F (trade name), made by Ouchi Shinko Kagaku K.K.

From the results shown in Table 1, it is understood that when the distance between the portion of bead core facing bead base and the carcass ply is 0.8 mm at minimum and the bead core covering ratio (b/a+b) of the adjacent flipper is 40% at maximum, the effect equal to or more than the case of using two pairs of bead cores can be obtained. Furthermore, it is obvious that the durability of the bead portion is further improved when the hardness of rubber material for flipper is not less than 65 and the extractable matter is not more than 8%.

EXAMPLE 3

This example examined a radial tire having a size of 1000-R20 14PR and comprising a carcass of 3 plies each containing PET cords of 2520 d/2 therein.

Four test tires as shown in the following Table 3 were manufactured by using the same tread rubber having a high rebound resilience as in Example 1. In these tires, the flipper was composed of nylon-6 fiber cords of 840 d/2 and the coating rubber for flipper was the rubber material (i) of Table 2.

The values of b/a+b, l, HD and extractable matter in Table 3 were measured from tires simultaneously manufactured in the same process. In this case, since the test tire was a radial tire, b/a+b and l were measured at a section of bead portion when the tire was cut in radial direction at an angle of 10°-20° shifted from a tangent of the inner periphery in the bead ring of the tire.

The test tire subjected to an internal pressure of 8.5 kg/cm$^2$ was run on a drum at a speed of 40 km/hr under a load of 3,000 kg, during which a running time until the occurence of bead failure was measured to obtain a result as shown in Table 3 wherein the running time was expressed as a drum durability by an index on the basis that the tire A is 100.

As apparent from Table 3, the durability of bead portion was confirmed to be considerably improved in the tires B and C according to the invention.

TABLE 3

| Kind of tire | | A | B | C | D |
|---|---|---|---|---|---|
| Maximum value of b/a + b (%) | | no flipper | 30 | 36 | 32 |
| Minimum distance of l (mm) | | 0.3 | 0.95 | 1.1 | 3.0 |
| Maximum value of l (mm) | | 0.5 | 1.2 | 1.3 | 3.5 |
| Surroundings of flipper in new tire | rubber hardness | — | 69 | 69 | 68 |
| | extractable matter (wt %) | — | 5.3 | 5.7 | 6.2 |
| Drum durability (index) | | 100 | 216 | 182 | 114 |

In the pneumatic tire according to the invention, the stress between the carcass ply and the bead core is mitigated by applying the above mentioned construction to the bead portion, whereby the durability of the bead portion may be improved without causing cord breaking-up of the carcass ply based on cracks in rubber produced by the stress acting between the carcass ply and the bead core. This means that even when the load applied to one bead core is increased in a large-size tire, tire life equal to that of the conventional tire can be obtained and hence the number of bead cores can be reduced. Particularly, the invention contributes to considerably improve the productivity in large-size pneumatic bias tires in view of the production of bead core, number of steps for tire built-up and the like.

What is claimed is:

1. In a pneumatic tire comprising a pair of bead portions each containing at least one bead core therein and a carcass of at least one rubberized ply extending between the bead portions and containing organic fiber cords therein; and having a load applied to one bead core per unit length of not less than 6.0 kg/cm, the improvement comprising; at least one tire-cord layer of organic fibers arranged as a flipper between the bead core and the carcass ply so that a distance between a portion of the bead core facing the bead base and the carcass ply is within a range of 0.8 to 3.0 mm and at least ⅛ of the periphery of the bead core is covered with the tire-cord layer and a ratio of the bead core covered with the organic fibers in the tire-cord layer adjacent to the bead core is 20-40%.

2. A pneumatic tire according to claim 1, wherein a rubber material embedding the tire-cord layer therein is a vulcanizable rubber consisting of 100 to 40 parts by weight of natural rubber and 0 to 60 parts by weight of at least one diene polymer and has a hardness after the vulcanization of not less than 65 and contains not more than 8% by weight of an extractable matter with a mixed solvent of acetone and chloroform after the vulcanization.

* * * * *